United States Patent [19]
Corrigan et al.

[11] Patent Number: 5,774,417
[45] Date of Patent: Jun. 30, 1998

[54] AMPLITUDE AND PHASE COMPENSATION IN DUAL-SENSOR OCEAN BOTTOM CABLE SEISMIC DATA PROCESSING

[75] Inventors: Dennis Corrigan, Plano, Tex.; Vaughn L. Ball, Kemang, Indonesia

[73] Assignee: Atlantic Richfield Company, Los Angeles, Calif.

[21] Appl. No.: 738,026

[22] Filed: Oct. 25, 1996

[51] Int. Cl.$^6$ ............................... G01V 1/28; G01V 1/38
[52] U.S. Cl. ............................... 367/24; 367/21; 364/421
[58] Field of Search ........................ 367/21, 24; 364/421

[56] References Cited

U.S. PATENT DOCUMENTS

| | | | |
|---|---|---|---|
| 2,757,356 | 7/1956 | Haggerty | 349/7 |
| 4,486,865 | 12/1984 | Ruehle | 367/24 |
| 4,520,467 | 5/1985 | Berni | 367/24 |
| 4,979,150 | 12/1990 | Barr | 367/24 |
| 5,163,028 | 11/1992 | Barr et al. | 367/13 |
| 5,235,554 | 8/1993 | Barr et al. | 367/21 |
| 5,365,492 | 11/1994 | Dragoset, Jr. | 367/21 |
| 5,408,441 | 4/1995 | Barr et al. | 367/21 |
| 5,621,700 | 4/1997 | Moldoveanu | 367/24 |

OTHER PUBLICATIONS

Paffenholz, et al., "An improved method for deriving water–bottom reflectivities for processing dual–sensor ocean–bottom cable data", *Expanded Abstracts of the 65$^{th}$ Annual Meeting of the Society of Exploration Geophysicists*, (SEG, 1995), pp. 987–990.

Barr and Sanders, "Attenuation of Water–Column Reverberations Using Pressure and Velocity Detectors in a Water–Bottom Cable", presented at *59$^{th}$ Annual Meeting of the Society of Exploration Geophysicists* (SEG, 1989).

Soubras, "Calibration and Deghosting of Ocean Bottom Hydrophone and Geophone Measurements", *EAGE 58$^{th}$ Conference and Technical Exhibition*, paper B019 (Jun. 3–7, 1996).

Barr, et al., "Attenuation of Water–Column Reverberations Using Pressure and Velocity Detectors in a Water–Bottom Cable", *Expanded Abstracts with Biographies: 1989 Technical Program: 59$^{th}$ Annual International SEG Meeting*, (Society of Exploration Geophysicists), pp. 653–656.

Dragoset, et al., "Ocean–bottom cable dual–sensor scaling", *Expanded Abstracts with Biographies: 1994 Technical Program: SEG International Exposition and 64$^{th}$ Annual Meeting*, (Society of Exploration Geophysicists), pp. 857–860.

Primary Examiner—Ian J. Lobo
Attorney, Agent, or Firm—Anderson, Levine & Lintel

[57] ABSTRACT

A method and computer system for applying corrections to dual sensor ocean bottom cable marine seismic signals, for purposes of eliminating ghosts and reverberations, are disclosed. According to the disclosed method and system, both phase and amplitude corrections are derived in common receiver gathers, and applied to each geophone trace in the gather; preferably, the derivation of the corrections is performed on a limited offset common receiver gather. The phase correction is determined by minimizing a folded cross-correlation of the hydrophone and geophone signals over varying phase angles, with the appropriate phase correction corresponding to the angle at which the minimum is obtained; preferably, stacked cross-correlations are used in the phase correction determination to reduce the effects of random noise. The phase correction is then applied to the geophone traces in the gather, and an amplitude correction is derived by minimizing a cross-ghosting relationship. Preferably, the cross-ghosting minimization is based upon stacked cross-correlations of the geophone and hydrophone signals and a stacked hydrophone autocorrelation, to eliminate the effects of coherent noise on the geophone trace and the effects of random noise on both the geophone and hydrophone traces. The amplitude correction is then applied to each of the geophone traces in the gather, and the summation scalar is then derived and used to sum the geophone and hydrophone traces for each source-receiver path. The summation scalar may be selected to compensate not only for ghosts, but also for receiver-side reverberations. The summation scalar may also be derived using an estimate for the seafloor reflectivity that takes into account source-side reverberations.

23 Claims, 5 Drawing Sheets

AMPLITUDE AND PHASE COMPENSATION IN DUAL-SENSOR OCEAN BOTTOM CABLE SEISMIC DATA PROCESSING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of seismic prospecting for oil and gas reservoirs, and is more specifically directed to marine seismic prospecting using dual-sensor ocean bottom cables.

In the field of marine seismic prospecting, many surveys are performed using ocean bottom cable technology. According to this approach, acoustic detectors are deployed at fixed locations at or near the ocean bottom, and an acoustic source is towed near the ocean surface. The acoustic source imparts acoustic energy into the water that is reflected from geological strata and interfaces below the ocean bottom. The reflection signals measured by the acoustic detectors are indicative of the depth and location of the reflecting geological features. Ocean bottom cable detectors are often advantageous, as compared to towed detectors, in performing surveys in crowded offshore regions, such as may be encountered near offshore drilling and production platforms (which are often present, of course, near important hydrocarbon reserves). The cost of each pass of the source vessel through the survey region is also relatively low when using ocean bottom detector cables, considering that hydrophone streamers need not be towed by the source vessel.

Figure 1:
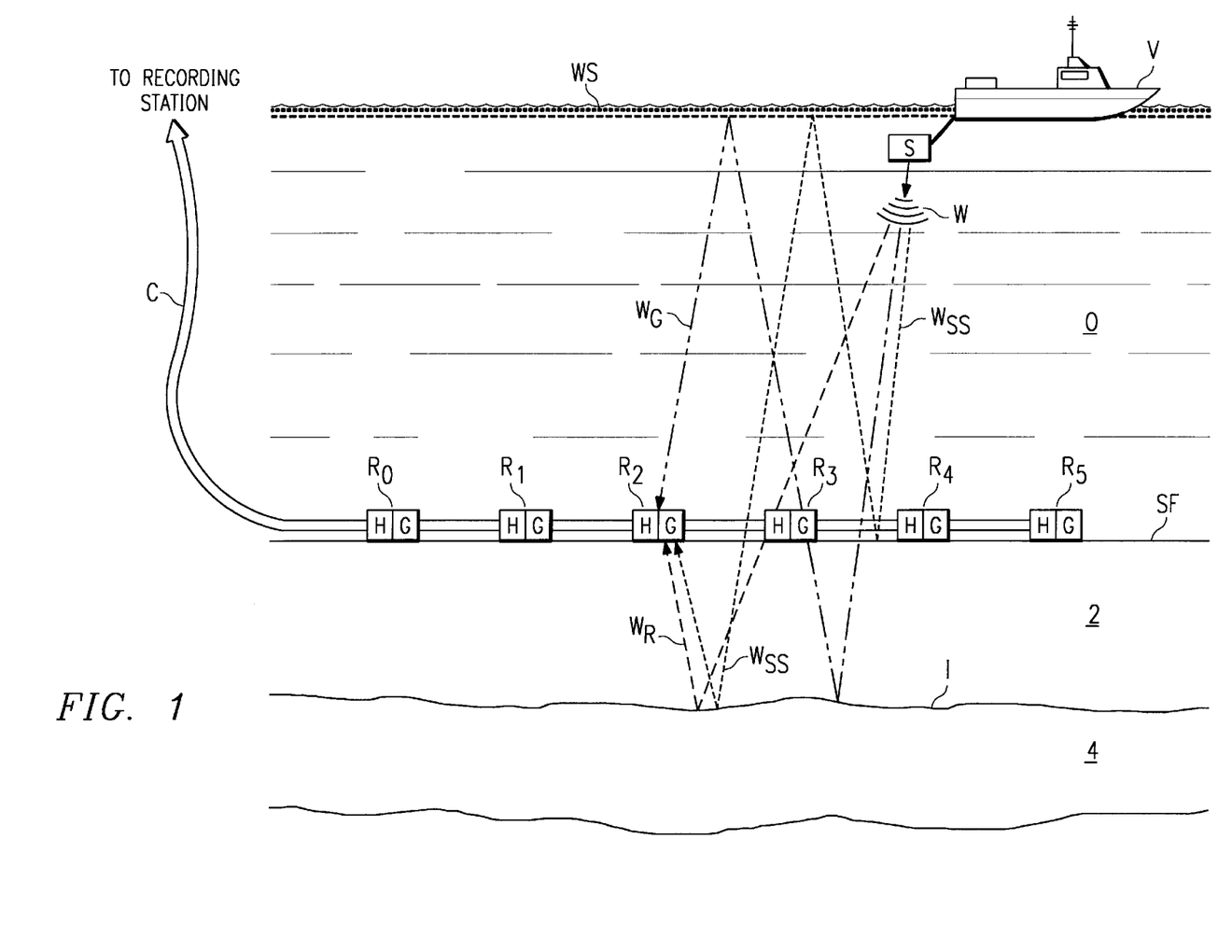
FIG. 1 is a schematic elevation and cross-sectional view of a marine region at which a seismic survey is being performed using a dual sensor ocean bottom cable, according to both conventional techniques and according to the preferred embodiment of the invention.

As is well known in the field of marine seismic surveying, however, so-called ghost reflections are present in the signals detected by the ocean bottom cable detectors. Referring now to FIG. 1, a conventional ocean bottom cable survey is illustrated, for purposes of explaining the ghost reflection mechanism. As shown in FIG. 1, vessel V at surface WS of ocean O is towing a source S that is periodically activated to produce acoustic waves; cable C is in place upon seafloor SF, having multiple receiver locations $R_0$ through $R_5$, each having both a hydrophone H for detecting pressure waves and a geophone G for detecting velocity of the wave (i.e., particle motion). As shown in FIG. 1, source S imparts, into the water, spherical acoustic wave W which is intended to travel downwardly and reflect from the interface I between formations 2 and 4. Because of the spherical (i.e., non-directional) nature of imparted wave W and because of the multiple reflective surfaces (i.e., interface I, water surface SF, seafloor SF), however, reflected energy following paths other than the direct reflecting path may be detected by each receiver location R.

By way of example, FIG. 1 illustrates multiple paths of reflections that may be detected by receiver location $R_2$. Reflected wave $W_R$ corresponds to a direct reflection of imparted wave W from interface I to receiver location $R_2$. Hydrophone H and geophone G at receiver location $R_2$ generate electrical signals responsive to the detected reflected wave $W_R$, and forward these signals to a receiving station (not shown) via cable C. However, water surface WS also reflects acoustic energy, and as such hydrophone H and geophone G also detect reflections following path $W_G$ from source S, reflected first from interface I and then by water surface WS before reaching receiver location $R_2$ as a downgoing wave. Wave $W_G$ is an example of a reflection that is referred to in the art as a receiver-side "ghost". Also present in many surveys are receiver-side reverberations (not shown in FIG. 1), which consist of waves that travel from source S to interface I, and then reflect multiple times between water surface WS and seafloor SF before reaching a receiver location R as a downgoing wave; these receiver-side reverberations will also appear in the recorded signals from cable C.

As is evident from FIG. 1 and as is fundamental in the art, the ghost reflection from the water surface WS to receiver location R (e.g., wave $W_G$) generally does not provide any additional information regarding the location or attributes of interface I between subsurface strata 2, 4 that is not directly conveyed by reflected wave $W_R$, and as such is merely noise in the detected vibrations. Deep deployment of cable C especially exacerbates the problem of ghost reflections, since the travel time of ghost reflections from surface SF to receiver locations R may be sufficiently long as to cloud direct reflections from deeper subsurface strata. Ghost reflection effects have been observed to be especially severe for ocean bottom cables used in ocean depths of 10 meters and greater, generally requiring substantial alterations in acquisition and processing techniques to obtain meaningful subsurface survey information.

Many techniques have been used to attempt to remove the effects of ghost reflections from marine surveys, especially of the ocean bottom cable type. The arrangement of FIG. 1 illustrates one approach, in which both hydrophones H and geophones G are deployed at each receiver location R. As described in U.S. Pat. Nos. 4,486,865 and 5,365,492, the true reflection from the subsurface feature has a positive polarity as detected by both hydrophone H and geophone G. On the other hand, the ghost reflection has a negative polarity as detected by geophone G, due to the inverting effect upon velocity waves at the reflecting water surface, but has a positive polarity as detected by hydrophone H. Theoretically, summing of the geophone and hydrophone signals should therefore reinforce the true reflection signal while canceling the ghost reflection artifacts.

By way of further background, specialized acquisition techniques have been used in estimating the optimal summation, for ghost reflection suppression, of geophone and hydrophone signals from dual-sensor ocean bottom cables, as described in Barr and Sanders, "Attenuation of Water-Column Reverberations Using Pressure and Velocity Detectors in a Water-Bottom Cable", presented at the $59^{th}$ Annual Meeting of the Society of Exploration Geophysicists (1989). Other known approaches have been implemented in seismic processing software, as described in U.S. Pat. Nos. 4,486,865 and 5,365,492.

By way of further background, copending application Ser. No. 08/640,089, filed Apr. 30, 1996, entitled "Method and System for Eliminating Ghost Reflections from Ocean Bottom Cable Seismic Survey Signals", assigned to Atlantic Richfield Company and incorporated herein by this reference, describes an improved technique for combining geophone and hydrophone signals from dual-sensor ocean bottom cables to suppress ghost reflection events.

Many conventional techniques for suppressing ghost reflections in dual sensor ocean bottom cable surveys by summation of the geophone and hydrophone signals essentially assume that all of the geophones are well-coupled to the ocean floor, that the response characteristics of all of the geophones and hydrophones to seismic waves are substantially ideal, and that no phase difference is present between the geophone and hydrophone signals. It has been observed, in connection with the present invention, that these assumptions are generally inaccurate to some degree. Because of the inaccuracy of these assumptions, it is difficult to eliminate ghost reflections from dual sensor ocean bottom cable surveys in many situations.

In addition, as is well known in the art, significant noise is often present in the signals recorded by the ocean bottom sensors. This noise may be of either or both of the random and coherent types. In addition, the geophones and hydrophones are often differentially affected by noise. For example, geophones are particularly susceptible to recording cable noise, to noise in the form of converted shear modes, and to coherent noise; less-than-ideal coupling of the sensors to the ocean bottom exacerbates these effects. This differential recording noise is particularly difficult to eliminate according to conventional dual sensor combination techniques.

FIG. 1 also illustrates another type of reverberation wave that presents difficulty in the analysis of dual sensor ocean bottom cable surveys, referred to in the art as "source-side reverberations". Source-side reverberation wave $W_{SS}$ is illustrated in FIG. 1 as traveling from source S, reflecting from seafloor SF and then from water surface WS, before traveling into the subsurface and reflecting from interface I, after which wave $W_{SS}$ is detected by receiver location $R_2$ as an upgoing wave. While not shown in FIG. 1, source-side reverberations may reflect multiple times within the water column between seafloor SF and water surface WS before entering the subsurface below seafloor SF. Because source-side reverberations are upgoing when detected, conventional summation of the hydrophone and geophone signals will not cancel their effect, as both geophones and hydrophones will detect upgoing waves by positive polarity signals; indeed, summation can exacerbate the effects of source-side reverberations. Further, it has been observed that source-side reverberations can reduce the accuracy of estimated seafloor reflection coefficients, and thus the accuracy of the summation of geophone and hydrophone signals.

It is therefore an object of the present invention to provide a method and system for processing dual sensor ocean bottom cable seismic survey signals in such a way as to robustly eliminate ghost reflections over a wide range of survey situations.

It is a further object of the present invention to provide such a method and system in which the reflection signals may be analyzed in the presence of significant noise, including source-side reverberations and noise that is differentially recorded by the geophones and hydrophones.

It is a further object of the present invention to provide such a method and system in which the impact of noise is diminished without requiring explicit noise removal techniques prior to analysis, in a manner that is substantially insensitive to the nature or type of the noise.

It is a further object of the present invention to provide such a method and system in which ghost reflections may be eliminated in the case where one or more of the sensors are not well-coupled to the ocean floor.

It is a further object of the present invention to provide such a method and system in which ghost reflections may be eliminated in the case where the seismic response of one or more of the sensors is nonideal.

It is a further object of the present invention to provide such a method and system in which the signal processing is performed for individual receiver stations, thus providing the benefit of ghost reflection elimination in surveys where sensor coupling and recording characteristics vary widely from station to station.

It is also a further object of the present invention to provide such a method and system in which the effects of receiver-side reverberations may be reduced.

It is a further object of the present invention to derive a summation scalar for the hydrophone and geophone signals using an estimate of the seafloor reflection coefficient that accounts for the effects of source-side reverberations.

Other objects and advantages of the present invention will be apparent to those of ordinary skill in the art having reference to the following specification together with its drawings.

BRIEF SUMMARY OF THE INVENTION

The present invention may be implemented into a computer system and method of operating the same that filters the effects of ghost reflections from dual sensor marine seismic survey signals. According to the present invention, a relative phase response between pressure and velocity traces, in a plurality of pairs of pressure and velocity traces measured at the same survey receiver location, is estimated. One of the pressure or velocity traces in each pair is phase-modified by a phase shift corresponding to the estimated relative phase response. A relative sensitivity between the pressure and velocity traces is then estimated, and one of the pressure and velocity traces in each pair is amplitude-modified accordingly. The pressure and velocity traces in each pair are then summed, with a summation scalar applied to one of the pressure and velocity traces in each pair, to generate a plurality of summed traces for that receiver location.

According to a preferred embodiment of the invention, the relative phase response is estimated by way of a folded crosscorrelation of geophone and hydrophone traces within a common receiver gather of limited offset, with a corresponding phase shift applied to the geophone traces. In this embodiment, the relative sensitivity is estimated by minimizing a cross-ghosting difference function, and the geophone traces are amplitude-modified accordingly. A summing scalar value is then generated and used in combining the geophone and hydrophone traces in the gather, at all offsets. According to a further embodiment in which the effects of either ghost reflections or both ghosts and receiver-side reverberations are to be minimized, an estimate of the seafloor reflectivity is generated for each receiver location in such a manner as to account for the effects of source-side reverberations. The present invention may also be implemented to reduce the effects of coherent geophone noise by using an estimated geophone autocorrelation, based upon geophone-hydrophone cross-correlations and the hydrophone autocorrelation, to derive the estimated seafloor reflectivity upon which the summing scalar is based.

DETAILED DESCRIPTION OF THE INVENTION

As will become apparent from the detailed description of the preferred embodiment of the invention provided hereinbelow, the present invention is directed to the optimization of signals from dual sensor marine seismic surveys such as those used in connection with ocean bottom cables. The present invention is useful with a multitude of marine survey designs (i.e., arrangements of receiver locations relative to the source shots). For purposes of clarity, however, the preferred embodiment of the invention will be described in the context of a simple ocean bottom cable marine survey as illustrated in FIG. 2, to which attention is now directed.

Figure 2:
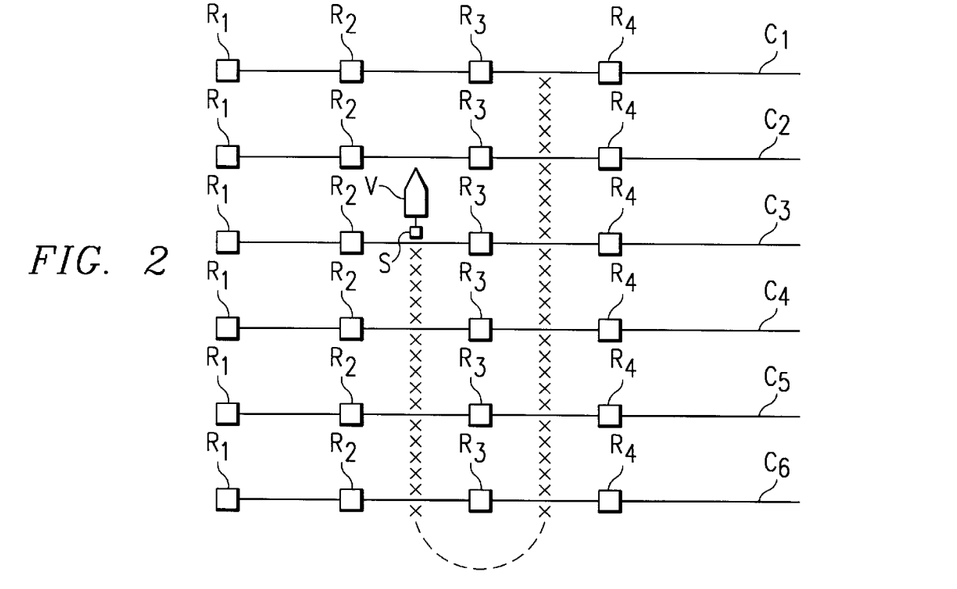
FIG. 2 is a plan view of a marine survey using ocean bottom cables, in connection with which the preferred embodiment of the invention may be used.

FIG. 2 is a plan view of a typical marine seismic survey in connection with which the preferred embodiment of the invention may be used. In the survey of FIG. 2, six cables $C_1$ through $C_6$, each having multiple dual sensor receiver locations R, are deployed over the survey area. While only four receiver locations, $R_1$ through $R_4$, are shown for each cable $C_1$ through $C_6$ in FIG. 2 for the sake of clarity, ocean bottom cables typically include many more receiver locations, for example on the order of forty per cable. Each of cables $C_1$ through $C_6$ is deployed substantially as illustrated for the single cable C of FIG. 1. Each receiver location R in the survey of FIG. 2 is associated with both a geophone and also a hydrophone, similarly as described hereinabove relative to FIG. 1, so that both velocity and pressure measurements may be made at each receiver location R in the seismic survey. Vessel V tows acoustic source S along multiple paths above cables $C_1$ through $C_6$, typically perpendicularly thereto. Source S is activated at multiple locations (each indicated by an X in FIG. 2) along each path, directing an acoustic wave substantially downward toward the ocean bottom at each location. Each receiver location R in each of cables $C_1$ through $C_6$ will thus receive direct and reflected acoustic energy emanating from each activation of source S, resulting in multiple traces of both pressure (hydrophone) and velocity (geophone) measurements over time. The reflected energy will include both the desired reflections from geological features, ghost reflections from the water surface, and also other reverberations, as described hereinabove.

As is well known in the art, the hydrophone frequency domain signal H, for near-vertical compressional waves, is a modulation of the true subsurface reflection signal B as follows:

$$H = \frac{1 + se^{-i\omega t}}{1 + rse^{-i\omega t}} B$$

where r is the reflection coefficient at seafloor SF (for waves in the water column), where s is the reflection coefficient at water surface WS (also for waves in the water column), which is typically −1, and where, in the expression $e^{-i\omega t}$ for the two-way propagation of sound in the water column, ω is angular frequency and t is the two-way time in the water. As noted above, the hydrophone signal corresponds to a pressure trace. The geophone frequency domain signal G, which physically corresponds to the product of particle velocity $V_z$ with the density ρ and acoustic velocity c of the water, is similarly a modulation of the true reflection signal B as follows:

$$G = \frac{1 - se^{-i\omega t}}{1 + rse^{-i\omega t}} B$$

These conventional frequency domain response descriptions are based upon the assumption of ideal coupling of the geophone to seafloor SF, and of ideal phase and amplitude response characteristics for both the hydrophone and the geophone (individually and relative to one another). It has been observed in connection with the present invention, however, that these assumptions of ideal coupling and ideal response are not always accurate, and as such data processing of signals processed according to conventional techniques may be erroneous. According to the preferred embodiment of the invention, the geophone frequency domain response is modified to incorporate a complex scale factor as follows:

$$G'' = ue^{i\gamma} \left( \frac{1 - se^{-i\omega t}}{1 + rse^{-i\omega t}} \right) B$$

where u is a scalar indicating the relative sensitivity of the geophone to its associated hydrophone, and where γ is a relative phase angle between the geophone and hydrophone responses. While, in general, the modification of the geophone response may be variable in amplitude or phase as a function of frequency, according to the preferred embodiment of the invention it has been found that the constant phase and amplitude assumption provides excellent results.

This relationship may be equivalently stated in the time domain. One may consider distorted hydrophone trace (or time sequence) $\overline{h}$ and distorted geophone trace $\overline{g}$ as incorporating the undistorted seismic reflection signal $\overline{b}$ (which includes primary reflections, wavelet, and interbed multiples, but no receiver-side reverberations or ghosts) as follows:

$$\overline{h} = \overline{b} * \overline{d_h}$$

$$\overline{g} = (\overline{b} * \overline{p}) * \overline{d_g}$$

The time sequences $\overline{d_h}$ and $\overline{d_g}$ are the hydrophone and geophone distortion operators, respectively, and the time sequence $\overline{p}$ is the differential geophone/hydrophone response (including relative phase and relative amplitude operators therein). Expressed in the time domain, the preferred embodiment of the present invention described herein is intended to derive a matching filter operator $\overline{f} = \overline{p}^{-1}$ and a summation scalar a (ranging from zero to unity) so that receiver-side ghosts and reflections are eliminated by summing the hydrophone trace $\bar{h}$ and the geophone trace $\bar{g}$ into a summed trace $\bar{m}$ defined as:

$$\bar{m}=a(\bar{f}*\bar{g})+(1-a)\bar{h}$$

As in the frequency domain definition of the modifier to the geophone response, the matching time domain filter operator $\bar{f}$ is assumed to have constant amplitude and phase over frequency, permitting its solution as a relative phase angle $\gamma$ and a relative sensitivity scalar u.

This definition of the modified geophone response G", or matching filter operator $\bar{f}$, to include the relative phase and sensitivity factors, according to this preferred embodiment of the invention, enables the elimination of ghost and reverberation effects in a manner that accounts for differences in instrument responses, non-ideal coupling, and other differences between the hydrophone and geophone at each receiver location.

As will be described in further detail hereinbelow, according to the preferred embodiment of the invention, the relative phase angle y and the relative sensitivity u of the geophone response at each receiver location are determined from a common receiver gather of geophone and hydrophone traces of relatively limited offset. Each of the geophone traces in the common receiver gather are then filtered by the filter operator corresponding to the estimated relative phase and sensitivity, and combined with its corresponding hydrophone trace to derive a summed trace in which ghost and reverberation effects are substantially eliminated. Conventional seismic survey processing may then be performed, including common midpoint stacks and the like, to derive the desired subsurface properties. The present invention thus eliminates the effects of ghost reflections even where imperfect sensor coupling and less than ideal sensor response is present at one or more receiver locations. As will also become evident from the following description, these filter operators are preferably determined and applied individually by receiver location, considering that the coupling and response characteristics among receivers may vary widely, even between adjacent receiver locations in the survey.

Figure 3:
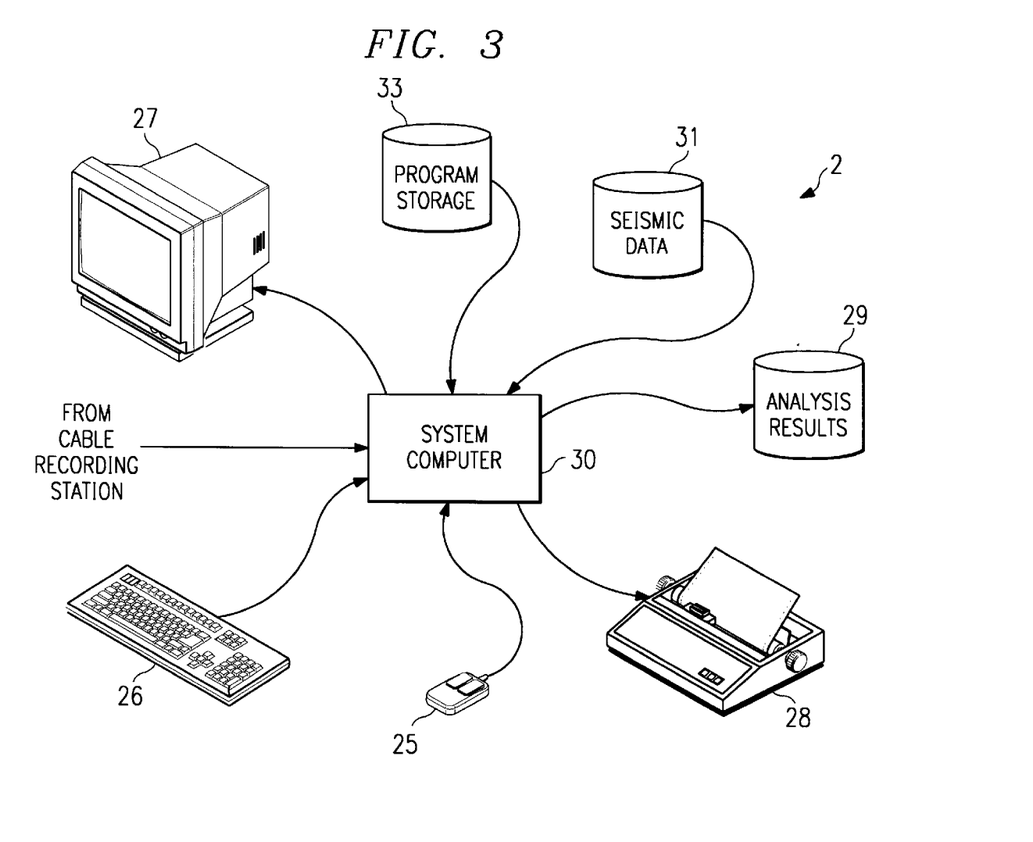
FIG. 3 is an electrical diagram, in block form, of a computer system programmed according to the preferred embodiment of the invention.

Referring next to FIG. 3, computer system 2, into which the preferred embodiment of the present invention may be implemented, will now be described by way of example. System 2 includes system computer 30, which may be implemented as any conventional personal computer or workstation, preferably a UNIX-based workstation such as a SPARCstation available from Sun Microsystems, Inc., implemented either in standalone fashion or as part of a network arrangement. System computer 30 is in communication with disk storage devices 29, 31, and 33, which are preferably external hard disk storage devices in a network. It is contemplated that disk storage devices 29, 31, 33 are conventional hard disk drives, and as such will be implemented by way of a local area network or by remote access. Of course, while disk storage devices 29, 31, 33, are illustrated as separate devices, a single disk storage device may of course be used to store any and all of the program instructions, measurement data, and results as desired.

In this embodiment of the invention, signals from both the hydrophones and geophones at receiver locations R in cables $C_1$ through $C_6$ of the survey of FIG. 2 are stored in digital form on disk storage device 31. System computer 30 can then retrieve the appropriate data from disk storage device 31 to perform the analysis of the preferred embodiment of the present invention, according to program instructions that correspond to the method described hereinbelow. For operation on system computer 30, the program instructions are written in the form of a computer program (e.g., in C++ or in any other suitable language) stored in computer-readable memory, such as program disk storage device 33 of FIG. 3; of course, the memory medium storing the computer program may be of any conventional type used for the storage of computer programs, including hard disk drives, floppy disks, CD-ROM disks, magnetic tape, and the like.

According to the preferred embodiment of the invention, system computer 30 presents output primarily onto graphics display 27, or alternatively via printer 28; further in the alternative, system computer 30 may store the results of the analysis described hereinbelow on disk storage 29, for later use and further analysis. Keyboard 26 and pointing device (e.g., a mouse, trackball, or the like) 25 are provided with system computer 30 to enable interactive operation. As noted, system computer 30 is able to communicate with disk storage devices 29, 31, including external hard disk storage on a network and floppy disk drives. System 2 is typically located at a data center remote from the survey region.

In the example of a marine survey, as shown in FIG. 1, system computer 30 is in communication with the geophones and hydrophones at receiver locations R in cables $C_1$ through $C_6$ (generally via a recording station, not shown), to receive signals indicative of the reflected acoustic energy received in the survey. As evident from the presence of both geophones and hydrophones, the signals received by system computer 30 will correspond to both velocity and pressure measurements over time generated at each receiver location R in the survey. These signals, after conventional formatting and other initial processing, are stored by system computer as digital data in disk storage 31 for subsequent retrieval and processing in the manner described hereinbelow. While FIG. 3 illustrates disk storage 31 as directly connected to system computer 30, it is also contemplated that disk storage device 31 may be accessible through a local area network or by remote access. Furthermore, while disk storage devices 29, 31 are illustrated as separate devices for storing input seismic data and analysis results, respectively, disk storage devices 29, 31 may of course be implemented within a single disk drive (either together with or separately from program disk storage device 33), or in any other conventional manner as will be fully understood by one of skill in the art having reference to this specification.

Figure 4:
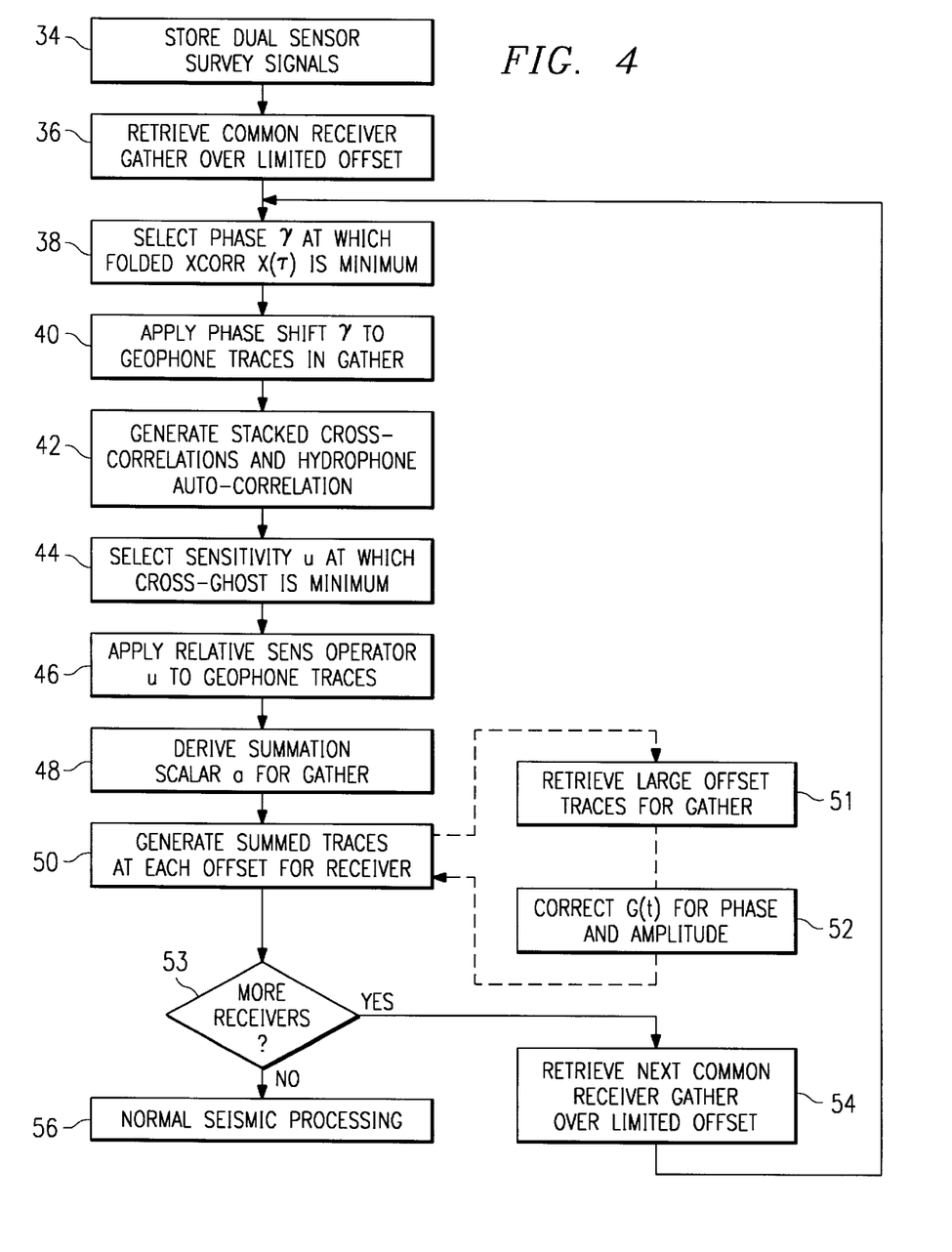
FIG. 4 is a flow chart illustrating the operation of the method according to the preferred embodiment of the invention.

Referring now to FIG. 4, a method of processing the signals detected at receiver locations R in a seismic survey to eliminate ghosts, and also receiver-side reverberations if desired, according to the preferred embodiment of the present invention, will now be described in detail.

The method of the preferred embodiment of the present invention begins with process 34, in which dual sensor survey signals are stored by system 2, for example in disk storage 31 shown in FIG. 3. Process 34 may be implemented in several different ways. If, for example, the process is being used in connection with a new ocean bottom cable survey, process 34 may include the acquisition of seismic data from a marine survey using dual sensor ocean bottom cables, for example as in the survey described hereinabove relative to FIGS. 1 and 2. Alternatively, the process according to the preferred embodiment of the invention may be applied to previously acquired dual sensor survey data, in which case process 34 may be performed, for example, simply by copying the survey data into disk storage 31 (if not already stored in system 2). In any case, the dual sensor survey signals will be stored, by process 34, in a digital form, consisting of ordered sequences of sample amplitudes, each sample corresponding to a time sample along the seismic signal trace. The sequences stored in process 34 will, given the dual sensors used, correspond to a geophone trace G(t) and a hydrophone trace H(t) for each shot-receiver combination in the survey.

According to the preferred embodiment of the present invention, processing of the geophone and hydrophone traces is performed in such a way as to account for noise and non-ideal coupling effects encountered at each specific receiver location in the survey. Considering that these effects are highly location specific, particularly in the case of coupling of sensors to the seafloor which may, of course, vary greatly even between adjacent receiver locations, processing according to the preferred embodiment of the invention is performed individually for each receiver location. Accordingly, referring to FIG. 4, once the seismic survey signals are stored in system 2, the analysis begins with process 36, in which system computer 30 retrieves the digital data corresponding to geophone and hydrophone traces detected at a first single receiver location R and having an offset (source-receiver distance) below a certain threshold distance. The grouping of traces retrieved in process 36 is commonly referred to in the art as a common receiver gather.

Limitation of the traces retrieved from memory in process 36 to below a certain offset distance is highly preferred according to this embodiment of the invention, as the relationships:

$$H = \frac{1 + se^{-i\omega t}}{1 + rse^{-i\omega t}} B$$

$$G = ue^{i\gamma} \left( \frac{1 - se^{-i\omega t}}{1 + rse^{-i\omega t}} \right) B$$

are valid only for compressional waves traveling near the vertical. By way of example, for ocean bottom cable survey signals acquired from depths exceeding 10 meters, the offset of traces retrieved in process 36 are preferably 500 meters and below.

Process 38 is next performed to derive a relative phase angle $\gamma$ between the geophone traces G(t) and the hydrophone traces H(t) for the receiver location R associated with the common receiver gather, to be applied to geophone traces G(t) as a matching filter operator. While the geophone traces are modified by the matching filter operators according to this embodiment of the invention, it is of course to be understood that the hydrophone traces may instead be modified, with equivalent results. As noted above, the relative phase angle $\gamma$ is typically dependent upon location specific factors, and as such is preferably derived for each receiver location R in the survey. According to the preferred embodiment of the invention, the relative phase angle $\gamma$ is derived prior to the relative sensitivity scalar u, as the accuracy of the relative sensitivity scalar u, and thus the accuracy of the overall analysis, is improved by first applying the relative phase angle $\gamma$ to the traces prior to derivation of the relative sensitivity scalar u.

Figure 5:
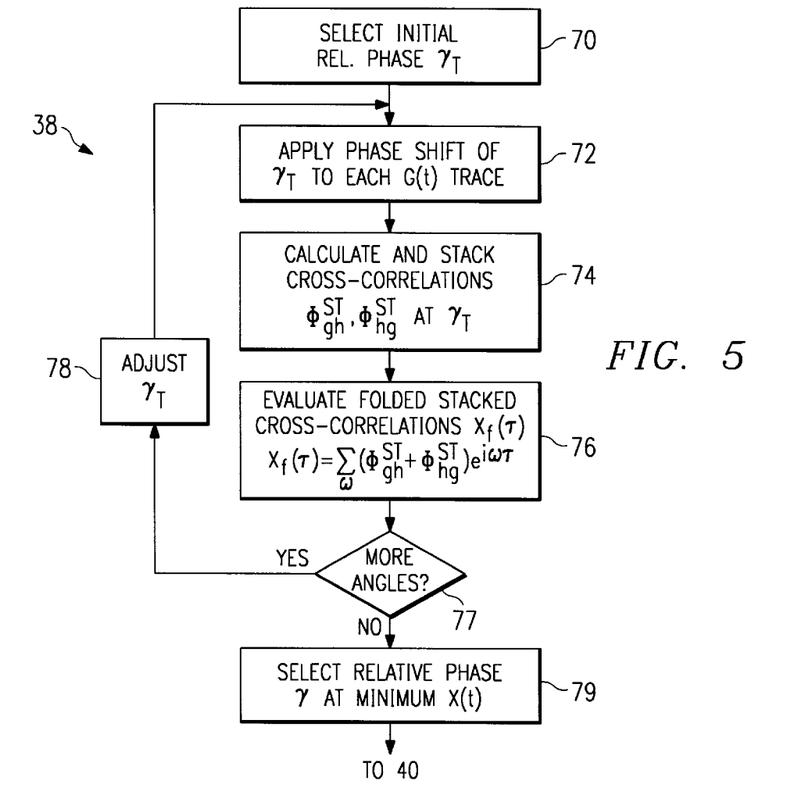
FIG. 5 is a flow chart illustrating the estimation of the relative phase angle of the geophone and hydrophone signals for a common receiver gather according to the preferred embodiment of the invention.

Referring now to FIG. 5, process 38 will now be described conceptually. Process 38 is initiated with an initial selection of relative phase angle $\gamma_T$, in process 70; as this is an iterative process, the actual angle initially selected for relative phase angle $\gamma_T$ and the direction of iteration from this initial selection is unimportant. Following process 70, a phase shift of angle $\gamma_T$ is applied, in process 72, to each of the geophone traces G(t) in the common receiver gather, resulting in modified traces $G_T(t)$. In process 74, system computer 30 then calculates cross-correlations of each hydrophone trace H(t) with its corresponding phase-shifted geophone trace $G_T(t)$, resulting in a pair of cross-correlations $\Phi_{hg}$, $\Phi_{gh}$ for each shot-receiver path in the common receiver gather. Considering the digital nature of traces G(t), H(t), and $G_T(t)$, it is preferred, for efficiency of processing, that the operations described herein be performed in the frequency domain, as is well known in the art. Accordingly, the cross-correlations of hydrophone trace H(t) and geophone trace $G_T(t)$ will correspond to the frequency domain cross-correlation $\Phi_{gh}=G_T{}^*H$, and the frequency domain cross-correlation $\Phi_{hg}=H^*G_T$.

In the case of ocean bottom cables, it has been observed that the bulk of the noise upon the hydrophone signals is random, while the geophone signals are particularly susceptible to coherent noise. For example, noise levels of approximately 35% have been observed in autocorrelations of geophone signals from a typical ocean bottom cable survey, with many receivers exhibiting noise levels of 50% and greater. The abundance of these extremely high noise levels has made the elimination of ghost reflections and reverberations difficult in many situations.

Figure 6:
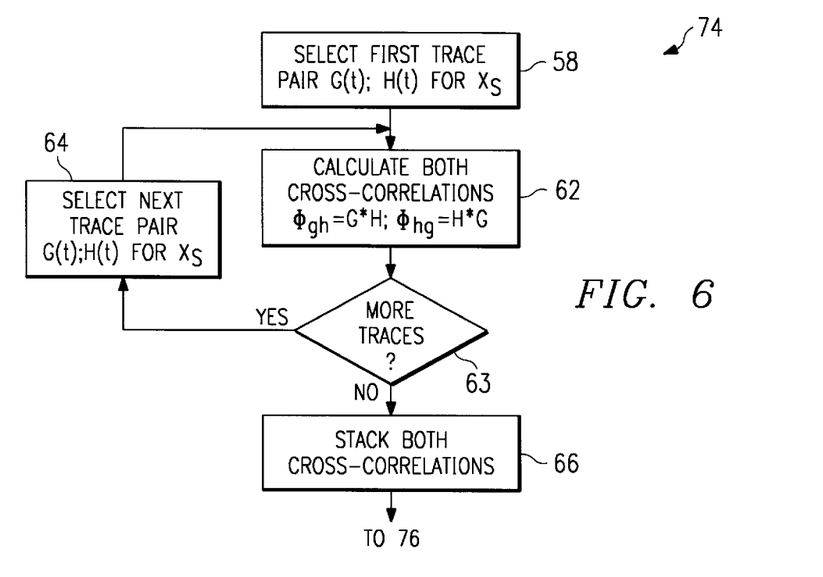
FIG. 6 is a flow chart illustrating the operation of stacking the geophone and hydrophone cross-correlations according to the preferred embodiment of the invention.

According to the preferred embodiment of the invention, therefore, process 74 is next performed, to reduce the effects of both coherent noise on the geophone traces and also random noise on both the hydrophone and geophone traces, by generating stacked cross-correlations of the geophone and hydrophone signals. Referring now to FIG. 6, process 74 according to the preferred embodiment of the invention will now be described in further detail.

Process 74 begins with the selection of a first trace pair in process 58. The trace pair selected includes a geophone trace G(t) and the corresponding hydrophone trace H(t) of the same shot location $x_s$, within the limited-offset common receiver gather; accordingly, geophone trace G(t) and hydrophone trace H(t) provide velocity and pressure measurements of the same seismic energy traveling the same path from source S to the corresponding receiver location R (in FIG. 1). While traces G(t), H(t) are referred to as functions of time, as noted above, it is more efficient, according to this embodiment of the invention, to perform this processing in the frequency domain, considering that traces G(t), H(t) are stored and retrieved as time-ordered sequences of samples. Following selection of traces G(t), H(t), system computer 30 next calculates, in process 62, both cross-correlations of hydrophone trace H(t) and geophone trace G(t), namely the frequency domain cross-correlation $\Phi_{gh}=G^*H$, and the frequency domain cross-correlation $\Phi_{hg}=H^*G$, and stores these cross-correlations in memory. Decision 63 determines whether additional traces in the limited offset common receiver gather retrieved in process 34 remain for calculation of the cross-correlations $\Phi_{gh}$, $\Phi_{hg}$; if so, process 64 selects the next trace pair G(t), H(t) for the next shot location $x_5$, and repeats process 62. Upon decision 63 determining that no additional traces remain in the common receiver gather of limited offset, control passes to stacking process 66.

In stacking process 66, each of the cross-correlations $\Phi_{gh}$, $\Phi_{hg}$ are stacked over the common receiver gather, by way of simple summation of the corresponding correlations. This stacking, as is well known in the art, serves to eliminate the effects of random noise in each of the correlation traces, since the signal portion will tend to reinforce in stacking while random noise will tend to cancel out. The result of process 66 are stacked cross-correlation traces $\Phi_{gh}{}^{ST}$, $\Phi_{hg}{}^{ST}$ associated with the common receiver gather. As noted above, the stacking of process 66 greatly reduces noise according to the preferred embodiment of the invention, since hydrophone signals typically have low noise, of the random type only, and since the hydrophone and geophone noise components are generally not correlated with one another.

Referring back to FIG. 5, system computer 30 then performs process 76 to evaluate a "folded" cross-correlation function $X_f(\tau)$, for the selected phase shift angle $\gamma_T$, using the stacked cross-correlations $\Phi_{gh}^{ST}$, $\Phi_{hg}^{ST}$. The folded cross-correlation function $X_f(\tau)$ is defined, in the preferred embodiment of the present invention, as follows:

$$X_f(\tau) = \sum_\omega (\Phi_{gh}^{ST} + \Phi_{hg}^{ST}) e^{i\omega\tau}$$

Decision 77 is then performed to determine if additional relative phase angles γ remain to be evaluated, in which case phase angle $\gamma_T$ is adjusted (i.e., incremented or decremented) in process 78, and processes 72, 74 are repeated to evaluate the folded cross-correlation function $X_f(\tau)$ for the new phase angle $\gamma_T$.

It has been discovered, in connection with the present invention, that the folded cross-correlation $X_f(\tau)$ has the property of vanishing when the relative phase between the hydrophone signal H(t) and the geophone signal $G_T(t)$ upon which the correlated signals are based is zero. Accordingly, the iteration of relative phase angle $\gamma_T$ will identify the actual phase difference between hydrophone signal H(t) and geophone signal G(t) at the angle that minimizes folded cross-correlation $X_f(\tau)$.

This property of folded cross-correlation $X_f(\tau)$ depends upon the assumption of noise free traces underlying the cross-correlations $\Phi_{gh}^{ST}, \Phi_{hg}^{ST}$ (which is met through the stacking process), and upon the water-surface reflection coefficient being −1 (which is generally valid). One may then consider the following three time-domain identities:

$$X_{gh} = Z_{gh} * Y_{gh}$$

$$Z_{gh} = X_{bb} * \bar{p}(t)$$

$$Z_{hg} = X_{bb} * \bar{p}(-t)$$

In these identities, X indicates cross-correlation of the recorded traces G(t), H(t) in the order specified by the subscripts, Z indicates correlation of the respective undistorted traces, and Y indicates correlation of the actual distortion operators for the respective traces. As before, the operator $\bar{p}(t)$ corresponds to the relative response of the geophone to the hydrophone. Based upon these relationships, one may readily derive the folded cross-correlation function $X_f$ as follows:

$$X_f = X_{gh} + X_{hg} = X_{bb} * [\bar{p}(t) * Y_{gh} + \bar{p}(-t) * Y_{hg}]$$

If, however, there is no phase difference between the geophone and hydrophone traces, $\bar{p}(t)$ is symmetric, such that $\bar{p}(t) = \bar{p}(-t)$. This means that the folded cross-correlation $X_f$ will reduce to the following:

$$X_f = X_{gh} + X_{hg} = X_{bb} * \bar{p}(t) * [Y_{gh} + Y_{hg}]$$

The expression in brackets will vanish, considering that the reflection coefficient at the water surface is assumed to be −1.

This property of the folded cross-correlation function may be easily seen in the z-transform domain. Consider the following definitions of the distortion operators $D_g$, $D_h$ and their complex conjugates, where r is the seafloor reflection coefficient, and considering both source-side reverberations and receiver-side ghosts and reverberations:

$$D_g = \frac{(1+z)}{(1+rz)^2} B$$

-continued $$D_g^* = \frac{(1+z^{-1})}{(1+rz^{-1})^2} B^*$$

$$D_h = \frac{(1-z)}{(1+rz)^2} B$$

$$D_h^* = \frac{(1-z^{-1})}{(1+rz^{-1})^2} B^*$$

using the value −1 as the reflection coefficient s at water surface WS. One may now readily derive the bracketed term $[Y_{gh} + Y_{hg}]$ as follows:

$$Y_{gh} + Y_{hg} \leftrightarrow D_g^* D_h + D_h^* D_g = 0$$

based upon the above-derived z-transform domain expressions for the distortion operators and their conjugates. Substitution of the above-noted definitions of the distortion operators $D_g$, $D_h$ and their complex conjugates into this relationship will readily demonstrate the vanishing of the term $[Y_{gh} + Y_{hg}]$ in the z-transform domain.

Figure 7:
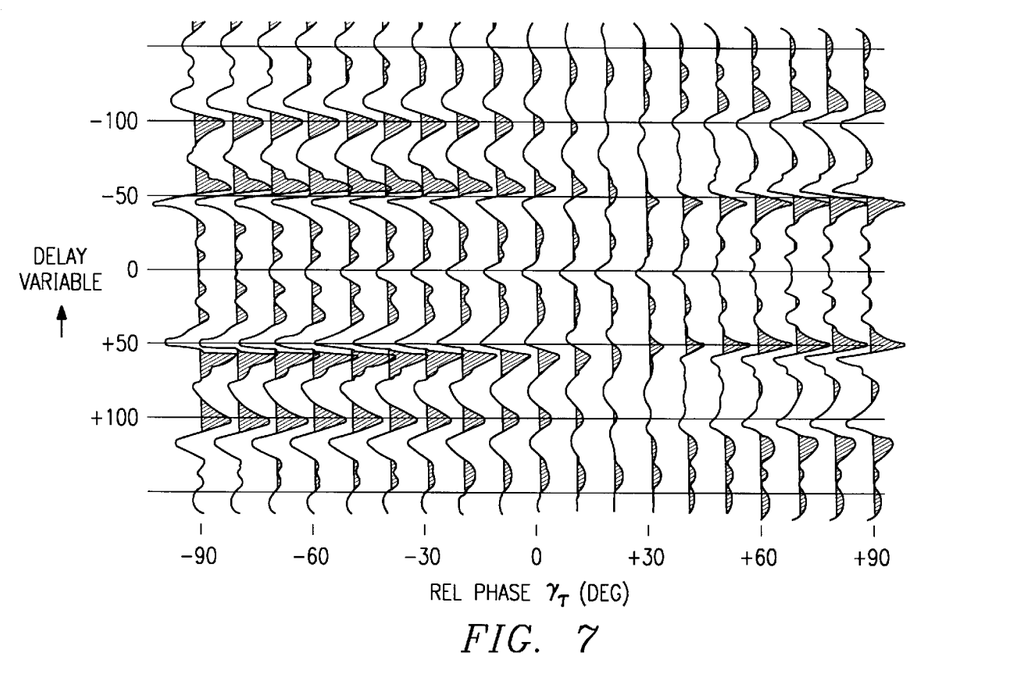
FIG. 7 is a plot of folded cross-correlations of the hydrophone and geophone signals as used in estimating the relative phase angle for a common receiver gather according to the preferred embodiment of the invention.

Accordingly, it can be seen that the minimum-energy folded cross-correlation function $X_f(\tau)$ will indicate the proper relative phase shift. As shown in FIG. 5, process 79 thus selects the relative phase angle γ that yielded the minimum folded cross-correlation function $X_f(\tau)$. FIG. 7 illustrates a series of folded cross-correlation functions $X_f(\tau)$ for an exemplary common receiver gather for varying relative phase angle $\gamma_T$. In this example of FIG. 7, the relative phase angle $\gamma_T$ of 30° provides the minimum folded cross-correlation function $X_f(\tau)$, thus indicating that the relative phase of the geophone traces to the hydrophone traces for this receiver location is +30°. In this example, application of a 30° phase shift to the geophone traces for this common receiver gather will substantially match the phases of the geophone and hydrophone signals.

In practice, system computer 30 will perform process 38 by way of a quantitative measurement of the evaluated folded cross-correlation functions $X_f(\tau)$. Typically, a measure of the energy within the folded cross-correlation functions $X_f(\tau)$ at the various angles (i.e., the integral $-\int |X_f(\tau)|^2 d\tau$) will provide such a measurement. This quantitative approach may be optimized, for example by way of a least-squares minimization, to permit estimation of the proper phase shift angle γ without requiring iterative recalculation of the folded cross-correlation function at multiple angles $\gamma_T$. In this approach, the stacked cross-correlations $\Phi_{gh}^{ST}, \Phi_{hg}^{ST}$ are applied to the following frequency-domain equation:

$$X(\omega) = \Phi_{gh}^{ST} e^{i\gamma} + \Phi_{hg}^{ST} e^{i\gamma}$$

By minimizing the energy of the autocorrelation:

$$J = \sum_\omega XX^*$$

as a function of phase over frequency ω, the desired phase shift γ is readily estimated. The minimization may be performed in either the time or frequency domain, using well-known iterative minimization techniques.

Once the relative phase angle γ has been derived in process 38, system computer 30 then applies the proper phase shift y to each of the geophone traces G(t) in the limited offset common receiver gather in process 40 (FIG. 4). Recalling the following model geophone response:

$$G = ue^{i\gamma}\left(\frac{1-se^{-i\omega t}}{1+rse^{-i\omega t}}\right)B$$

the phase shift is applied merely by the multiplication of the frequency domain series for each trace G(t) by the exponential $e^{-i\gamma}$. In other words, new traces G'(t) are generated by system computer 30 and stored in memory as follows:

$$G'(t)=e^{-i\gamma}G(t)$$

for each trace in the common receiver gather. Following process 40, each of the paired hydrophone and geophone traces in the common receiver gather will have substantially matched phases.

After the phase correction is applied to the geophone traces in process 40, process 42 is next performed by system computer 30 to generate stacked correlations for the geophone and hydrophone traces in the limited-offset common receiver gather, with the geophone traces having been shifted by the phase angle $\gamma$ determined in process 38, for use in deriving the relative sensitivity scalar u. The stacking of process 42 is performed in similar fashion as process 74 described hereinabove relative to FIG. 6, except that the cross-correlations $\Phi_{gh}^{ST}, \Phi_{hg}^{ST}$ are generated using modified geophone trace G'(t). In addition, since the process of deriving the relative sensitivity scalar u requires the hydrophone autocorrelation, process 42 further includes the calculation of individual hydrophone autocorrelations $\Phi_{hh}$ for each trace H(t) of the gather in the conventional manner (i.e., the product H*H of the frequency domain representation of trace H(t) with its complex conjugate); followed by summing the individual hydrophone autocorrelations $\Phi_{hh}$ into a stacked hydrophone autocorrelation $\Phi_{hh}^{ST}$. As noted above, stacking of the cross-correlations and hydrophone autocorrelations greatly reduces the effect of the random noise on both the hydrophone and geophone traces.

Once the stacked cross-correlations and stacked hydrophone autocorrelation are determined for the current gather in process 42, process 44 is next performed by system computer 30 to select the relative sensitivity value u for the geophone and hydrophone responses measured at the receiver location of the gather. According to the preferred embodiment of the invention, process 44 is performed by system computer 30 according to a "cross-ghosting" approach. Cross-ghosting refers to the application of the hydrophone ghost signal to the geophone trace, and the geophone ghost to the hydrophone trace. As noted hereinabove, the down-going ghost reflections have opposite polarities as detected by the hydrophone and geophone, while the up-going actual reflections have the same polarities. Accordingly, cross-ghosting of the hydrophone and phase-shifted geophone signals corresponds to the following equality, in the z-transform domain:

$$u(1+z)H(z)=(1-z)G'(z)$$

where u is the relative sensitivity scalar between the hydrophone signal H(t) and the phase-shifted geophone signal G'(z). One may therefore solve for u by minimizing the following difference:

$$\sum_{\omega} |u(1+z)H(z) - (1-z)G'(z)|^2$$

over all of the shots in the limited offset common receiver gather.

As noted above, the geophone signal G(t), and thus the sequence G'(z), often includes significant coherent noise. The above difference function is therefore preferably minimized in process 44, to solve for relative sensitivity scalar u by way of a least-squares minimization of the above sum after cross-correlating the hydrophone signal H(t) with each term in the sum as follows:

$$\sum_{\omega} \{u[H^*(z)H(z) + zH(z)^*H(z)] - [G'^*(z)H(z) - zG'^*(z)H(z)]\}^2$$

This approach avoids use of the geophone autocorrelation, which would have significant noise due to the vulnerability of geophone signals to coherent noise. According to the preferred embodiment of the invention, therefore, the effects of noise in the geophone and hydrophone traces is much reduced by using the stacked hydrophone autocorrelation and stacked cross-correlations, as described above. Therefore, to minimize the effects of random noise, the stacked hydrophone autocorrelation trace $\Phi_{hh}^{ST}$ and stacked cross-correlation trace $\Phi_{gh}^{ST}$ are preferably used in process 44 as follows:

$$\sum_{\omega} [u(\Phi_{hh}^{ST} + z\Phi_{hh}^{ST}) - (\Phi_{gh}^{ST} + z\Phi_{gh}^{ST})]^2$$

Minimization of this sum will then provide the estimated sensitivity scalar u.

Once the relative sensitivity scalar u is derived for the common receiver gather in process 44, each of the geophone traces G'(t) in the gather are again modified by system computer 30 to derive and store modified traces G"(t) as follows:

$$G''(t) = \frac{1}{u} G'(t) = \frac{1}{u} e^{-i\gamma}G(t)$$

Following process 46, each of the geophone traces G"(t) in the common receiver gather are now corrected for relative phase and amplitude differences between the geophone and hydrophone at the receiver location corresponding to the gather. The correction of the geophone traces will provide an improved basis for derivation of the proper summation scalar a for use in summing each hydrophone trace H(t) with its modified geophone trace G"(t) to produce a summed trace M(t) that is free from ghosts. Of course, as noted above, one may equivalently modify the hydrophone traces H(t) rather than the geophone traces G(t).

Selection of the summation scalar a is then performed in process 48 by system computer 30 according to the preferred embodiment of the invention, according to one of two different approaches, depending upon whether only receiver-side ghost elimination is desired or if both ghosts and receiver-side reverberations are also to be eliminated. In the case where only receiver-side ghosts are to be eliminated, the summed hydrophone and geophone signal M(z), in the frequency domain, may be stated as a function of the true reflection signal B(z) as follows:

$$M(z) = \frac{B(z)}{(1+rz)^2} [a(1+z) + (1-a)(1-z)]$$

where r is the reflection coefficient of the seafloor. Selection of the summation scalar a to be ½ will cause the bracketed term to reduce to unity, in which case the summed signal M(z) will be ghost-free. Process 48 in this simplest case is thus merely performed by setting summation scalar a to ½.

Alternatively, both receiver-side ghost and receiver-side reverberations may be eliminated by the proper selection of summation scalar a in process 48. In this case, the summation equation may be considered as:

$$M(z) = \frac{B(z)}{(1+rz)} \left[ \frac{a(1+z)}{(1+rz)} + \frac{(1-a)(1-z)}{(1+rz)} \right]$$

The bracketed term in this expression for the summed signal M(z) includes both the ghost and receiver-side reverberation expressions. Accordingly, in order to eliminate ghosts and receiver-side reverberations from the summed signal M(z), again the bracketed term must be reduced to unity. In this case, system computer 30 performs process 48 by selecting summation scalar a as follows:

$$a = \frac{1+r}{2}$$

in which case the bracketed term in the above expression for the summed signal will again reduce to unity, eliminating both ghosts and receiver-side reverberations. The value for seafloor reflection coefficient r may be based upon extrinsic measurements or other assumptions, in this case.

In practice, the seafloor reflection coefficient r is often not known by direct measurement, making it impossible to directly calculate the summation scalar $$a = \frac{1+r}{2}.$$

Furthermore, it has been observed that the presence of source-side reverberations introduces distortions that make it difficult to accurately determine the seafloor reflection coefficient r from the recorded geophone and hydrophone signals. However, according to the preferred embodiment of the invention, an analysis function is constructed, by way of which the distorting effects of source-side reverberations may be minimized in the estimation of the seafloor reflection coefficient r. This analysis function is constructed by incorporating the effects of all distortions, including ghosts, receiver-side reverberations, and source-side reverberations, into the summed signal expression M(z) as follows:

$$M(z) = B(z) \left[ \frac{a(1+z)}{(1+rz)^2} + \frac{(1-a)(1-z)}{(1+rz)^2} \right]$$

In this case, the value of the summation scalar a which reduces the bracketed term reduces to unity would be given by:

$$a = \frac{1+2r+r^2z}{2}$$

However, because the summation scalar a is a function of z in this case, there is no real value for the summation scalar a that can eliminate the effects of source-side reverberations by direct summing of the geophone and hydrophone signals. According to the preferred embodiment of the invention, an analysis function L is constructed through substitution of the above expression for the summation scalar a into the basic summation equation:

$$L(z) = aG(z) + (1-a)H(z)$$

to obtain the function L(z), in the frequency domain, as follows:

$$L(z) = \frac{1+2r}{2} G(z) + \frac{1-2r}{2} H(z) + \frac{r^2z}{2} (G(z) - H(z))$$

According to the preferred embodiment of the present invention, the autocorrelation of this function is minimized to find the seafloor reflection coefficient r, without the accompanying distortions due to source-side reverberations.

However, the presence of noise on the geophone and hydrophone traces often prevents direct computation of the autocorrelation of L(z) from being useful. According to this embodiment of the invention, therefore, the autocorrelation of L(z) (i.e., L*L) is performed by the linear combination of the autocorrelations and cross-correlations of the hydrophone response H and corrected geophone response G"(the " indicator implicit in the following equation):

$$L*L = \frac{(a^2+c^2)G*G + (b^2+c^2)H*H + (ab-c^2)(G*H+H*G) +}{ac(z^{-1}G*D + D*G) + bc(z^{-1}H*D + zD*H)}$$

where $a = \frac{1+2r}{2}$, $b = \frac{1-2r}{2}$, $c = \frac{r^2z}{2}$, and $D = G - H$.

According to the preferred embodiments of the invention, noise-free estimates of the cross-correlations and autocorrelations of the geophone and hydrophone signals are used to produce a relatively noise-free autocorrelation L*L, from which the best-fit reflection coefficient r may be selected, as will be described hereinbelow.

The value of seafloor reflection coefficient r obtained in this manner is then used in the above-described expression $$a = \frac{1+r}{2}$$

to produce the optimal summation scalar a. The summation of the modified geophone signal and the hydrophone signal, with this optimal summation scalar a, will thus provide a summed signal in which ghosts and receiver-side reverberations are eliminated. Because source-side reverberations will remain in the summed signals, however, filtering using the well-known technique of Weiner-Levinson deconvolution may be performed to eliminate the effects of sourceside reverberations, if desired.

Figure 8:
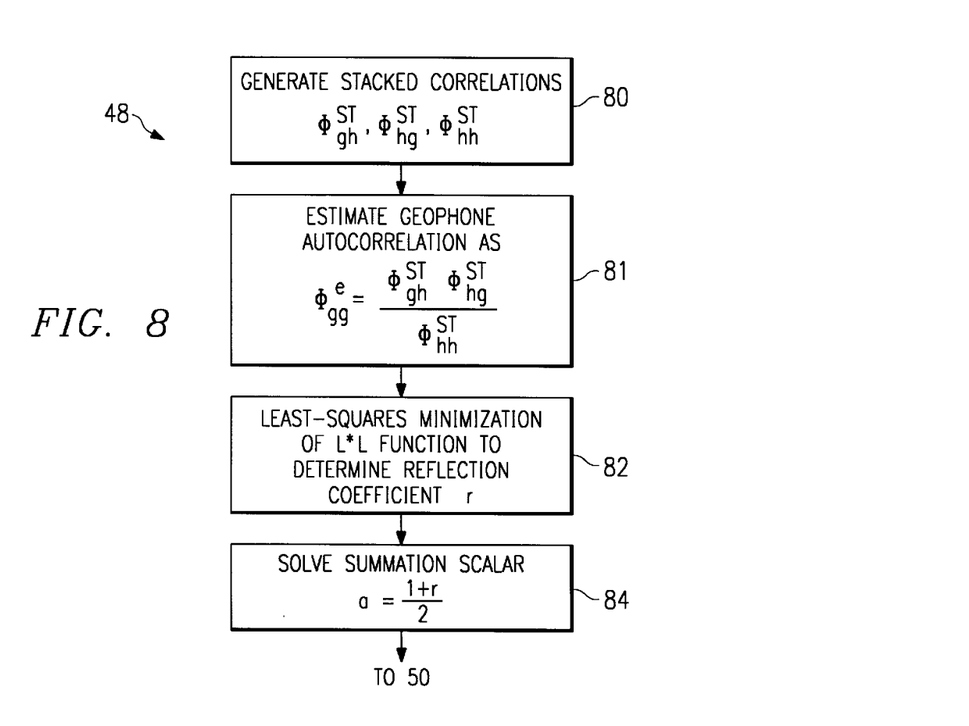
FIG. 8 is a flow chart illustrating the operation of determining a summation scalar to account for source-side reverberations according to the preferred embodiment of the invention.

Referring now to FIG. 8, process 48 in this alternative example according to the preferred embodiment of the invention will now be described in detail. Process 48 begins, in process 80, with system computer 30 again deriving, in similar manner as described hereinabove, the stacked hydrophone autocorrelation trace $\Phi_{hh}^{ST}$ and stacked cross-correlation traces $\Phi_{gh}^{ST}, \Phi_{hg}^{ST}$, associated with the common receiver gather and a new estimate $\Phi_{gg}^{e}$ for the geophone autocorrelation, all based upon and using the phase and amplitude corrected geophone trace G"(t) from process 46. Process 81 is next performed to derive an estimated geophone autocorrelation $\Phi_{gg}^{e}$ for the common receiver gather. This estimate utilizes the well-known autocorrelation and cross-correlation relationship:

$$\Phi_{gg} \Phi_{hh} = \Phi_{gh} \Phi_{hg}$$

which, of course, reduces to:

$$\Phi_{gg} = \frac{\Phi_{gh} \Phi_{hg}}{\Phi_{hh}}$$

This relationship is valid both for individual traces and for stacked traces. Accordingly, an estimate $\Phi_{gg}^{e}$ of the geophone autocorrelation $\Phi_{gg}$, substantially reduced in noise, is generated by system computer 30 in process 81 for the common receiver gather being processed as follows:

$$\Phi_{gg}^e = \frac{\Phi_{gh}^{ST}\Phi_{hg}^{ST}}{\Phi_{hh}^{ST}}$$

It is to be noted that the estimation of the geophone autocorrelation performed in process 81 may not be essential in some situations, specifically where the noise levels on the traces G"(t), H(t) are low enough that the ghost and reverberation elimination is not duly affected thereby. However, it is contemplated that the noise in most, if not all, practical surveys will be of sufficient magnitude that the estimation of geophone autocorrelation generated in process 81 will be beneficial.

Once the estimated geophone autocorrelation $\Phi_{gg}^e$ is determined, random noise is substantially eliminated from the process by the stacking of the correlations, and coherent geophone noise is ignored by generation of the estimated geophone autocorrelation. These correlations are then applied into the linear combination for autocorrelation L*L set forth above, in least-squares minimization process 82 performed by system computer 30 to determine the best-fit value of seafloor reflection coefficient r to minimize source-side reverberations. Such least-squares minimization is preferably performed according to conventional global minimization techniques, to yield a best-fit value for reflection coefficient r by an estimation that also includes the effects of sourceside reverberations.

In process 84 according to this embodiment, the summation scalar a is then simply calculated by system computer 30 as follows:

$$a = \frac{1+r}{2}$$

which will eliminate the effects of both ghosts and receiver-side reverberations, as described hereinabove.

Referring back to FIG. 4, once the desired summation scalar a is determined, system computer 30 now performs process 50 to generate a set of summed traces for each shot-receiver path associated with the current receiver location R, including both those of limited offset based upon which the correction and summation factor was derived, but also for those of larger offset. For those pairs of traces previously retrieved in process 36 (i.e., those of limited offset), the geophone trace G"(t) has already been generated and stored in process 46, and is used in the summation of process 50 along with its corresponding hydrophone trace H(t). System computer 30 retrieves the hydrophone and geophone traces for greater offset shots associated with the current receiver location in process 51, and corrects the retrieved geophone traces in process 52 according to the previously determined relative phase y and relative sensitivity scalar u derived in processes 40, 44, as follows:

$$G"(t) = \frac{1}{u} G'(t) = \frac{1}{u} e^{-i\gamma}G(t)$$

prior to summation in process 50. The summed traces are then stored in memory, associated with the current receiver.

Decision 53 then determines if additional receiver locations R in the survey remain to be similarly corrected and summed, in which case process 54 is performed to retrieve the next limited-offset common receiver gather, for which the correction and summation processes 38 through 50 are then performed. As noted above, since the phase and sensitivity variations for geophone and hydrophone signals are typically localized, the signals from each receiver location in the survey are individually corrected to account for such localized effects. Upon completion of correction for all of the receivers in the survey (decision 53 is NO), summed traces over the entire survey have been generated.

If desired, quality control may be effected during the process of FIG. 4, by generating and comparing attributes of the process against preselected quality thresholds. In the event that the quality control attributes indicate that the above method is not well-behaved, one may estimate the relative sensitivity scalar u as follows:

$$u_{est} = P\left(\frac{a(\overline{h})}{a(\overline{g_{nf}})}\right)$$

where $a(\overline{h})$ is the amplitude of the recorded hydrophone signal, where $a(\overline{g_{nf}})$ is the amplitude of the noise-free geophone trace, derived from the estimated geophone autocorrelation $\Phi_{gg}^e$, and where the ratio P is obtained by correlation in well-behaved areas of the traces and gathers.

Process 56, illustrated in FIG. 4, may then be performed by system computer 30 to effect the desired seismic processing upon the summed traces. This processing may include such typical seismic corrections as normal moveout correction (NMO or NMOC), filtering for source-side reverberations as noted hereinabove, and the like, followed by conventional survey techniques such as common midpoint gathers and stacks, subsurface velocity analysis, amplitude-versus-offset analysis (AVO), and the like, as desired for generation of the survey. The marine survey generated according to the preferred embodiment of the invention provides the benefits of dual sensor ocean bottom cable technology, but with improved ghost elimination provided by the improved matching of geophone and hydrophone signals for each receiver location. In addition, as described hereinabove, the preferred embodiment of the invention enables the elimination or reduction of such effects as source-side and receiver-side reverberations, further improving the signal-to-noise ratio and accuracy of the summed dual sensor signals.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of filtering the effects of ghost reflections from dual sensor marine seismic survey signals, comprising the steps of:

retrieving signals corresponding to a plurality of pairs of pressure and velocity traces measured at a first receiver location in the survey, wherein the pressure and velocity traces in each pair each include a modulated signal corresponding to energy imparted from a common source location in the survey and reflected from a subsurface reflecting interface;

from the plurality of pairs of pressure and velocity traces, estimating a relative phase angle between the modulated signals of the pressure and velocity traces;

phase-modifying the pressure and velocity traces in each pair, relative to one another, with a phase shift corresponding to the estimated relative phase angle;

from the plurality of pairs of pressure and velocity traces, estimating a relative sensitivity between the modulated signals of the pressure and velocity traces;

amplitude-modifying the pressure and velocity traces in each pair, relative to one another, with an amplitude scalar corresponding to the estimated relative sensitivity; and after the phase-modifying and amplitude-modifying steps, performing a weighted summing of the pressure and velocity traces in each pair, using a summation scalar as a weighting factor, to generate a plurality of summed traces.

2. The method of claim 1, wherein each pressure trace corresponds to a hydrophone trace, and wherein each velocity trace corresponds to a geophone trace, said hydrophone traces and geophone traces obtained near a region of a seafloor.

3. The method of claim 2, wherein the step of estimating a relative sensitivity comprises:

minimizing a difference between a first term comprised of a hydrophone ghost signal applied to the geophone trace, and a second term comprised of a geophone ghost signal applied to the hydrophone trace, wherein one of the first and second terms is multiplied by a scalar value; and selecting the scalar value corresponding to the minimized difference as the relative sensitivity.

4. The method of claim 2, wherein the step of estimating a relative phase angle comprises the steps of:

minimizing a folded cross-correlation of the geophone and hydrophone traces over a range of relative phase shifts between the geophone and hydrophone traces; and selecting the phase shift at which the folded cross-correlation is a minimum as the estimated relative phase angle.

5. The method of claim 4, further comprising:

before the minimizing step, for each of the pairs, determining a hydrophone-geophone cross-correlation, and a geophone-hydrophone cross-correlation;

after the determining step, stacking each of the hydrophone-geophone cross-correlations into a stacked hydrophone-geophone cross-correlation, and stacking each of the geophone-hydrophone cross-correlations into a stacked geophone-hydrophone cross-correlation;

and wherein the minimizing step is performed using the stacked hydrophone-geophone cross-correlation and the stacked geophone-hydrophone cross-correlation.

6. The method of claim 1, wherein the weighted summing step comprises:

selecting the summation scalar to be ½.

7. The method of claim 1, wherein the weighted summing step comprises:

selecting the summation scalar to be 1+r/2, where r is a reflection coefficient for the seafloor.

8. The method of claim 1, wherein the weighted summing step comprises:

after the amplitude-modifying step, for each of the pairs, determining a hydrophone autocorrelation, a hydrophone-geophone cross-correlation, and a geophone-hydrophone cross-correlation;

after the determining step, stacking each of the hydrophone autocorrelations into a stacked hydrophone autocorrelation, stacking each of the hydrophone-geophone cross-correlations into a stacked hydrophone-geophone cross-correlation, and stacking each of the geophone-hydrophone cross-correlations into a stacked geophone-hydrophone cross-correlation;

estimating a geophone autocorrelation as the ratio of the product of the stacked hydrophone-geophone cross-correlation and the stacked geophone-hydrophone cross-correlation to the stacked hydrophone autocorrelation;

minimizing an autocorrelation function based upon the stacked hydrophone-geophone cross-correlation, the stacked geophone-hydrophone cross-correlation, the stacked hydrophone autocorrelation, and the estimated geophone autocorrelation, to estimate a seafloor reflection coefficient r at the minimum of the autocorrelation function; and selecting the summation scalar to be $$\frac{1+r}{2}.$$

9. The method of claim 1, wherein the retrieving step retrieves signals corresponding to pairs of pressure and velocity traces associated with source-receiver paths having an offset distance below a threshold value.

10. The method of claim 9, further comprising:

retrieving signals corresponding to a second plurality of pairs of pressure and velocity traces associated with the first receiver location in the survey and corresponding to pairs of pressure and velocity traces associated with source-receiver paths having an offset distance above the threshold value;

after the step of estimating a relative sensitivity, phase-modifying one of the retrieved pressure and velocity traces in each of the second plurality of pairs of pressure and velocity traces with the phase shift corresponding to the estimated relative phase response; and amplitude-modifying one of the pressure and velocity traces in each of the second plurality of pairs of pressure and velocity traces with the amplitude scalar corresponding to the estimated relative sensitivity;

wherein the weighted summing step is performed for the velocity and pressure traces in each pair retrieved in the retrieving steps.

11. The method of claim 1, wherein the velocity trace in each pair is modified in each of the phase-modifying and amplitude-modifying steps.

12. The method of claim 1, further comprising:

repeating the retrieving, estimating, phase-modifying, amplitude-modifying, and weighted summing steps for a plurality of pairs of pressure and velocity traces associated with a second receiver location in the survey.

13. The method of claim 12, further comprising:

generating a seismic survey based upon the summed traces.

14. A computer system for filtering the effects of ghost reflections from seismic survey signals corresponding to acoustic energy generated by a marine source and detected at a plurality of receiver locations, such detected energy including acoustic energy reflected from subsurface geological structures and ghost reflections from the water surface, wherein each of the receiver locations comprise a geophone for measuring velocity signals and a hydrophone for measuring pressure signals, comprising:

a computer memory for storing seismic trace data corresponding to pairs of velocity and pressure signals, each pair associated with a common source-receiver path;

an output device, for displaying a seismic survey based upon the stored summed traces corresponding to each of the receiver locations; and a system computer, coupled to the computer memory and to the output device, programmed to perform, for each of the plurality of receiver locations, the steps of:

retrieving, from the computer memory, digital data corresponding to a plurality of pairs of pressure and velocity traces measured at the receiver location, wherein the pressure and velocity traces in each pair each include a modulated signal corresponding to energy imparted from a common source location in the survey and reflected from a subsurface reflecting interface;

from the plurality of pairs of pressure and velocity traces, estimating a relative phase angle between the modulated signals of the pressure and velocity traces;

phase-modifying the pressure and velocity traces in each pair, relative to one another, with a phase shift corresponding to the estimated relative phase angle;

from the plurality of pairs of pressure and velocity traces, estimating a relative sensitivity between the modulated signals of the pressure and velocity traces;

amplitude-modifying the pressure and velocity traces in each pair, relative to one another, with an amplitude scalar corresponding to the estimated relative sensitivity; and after the phase-modifying and amplitude-modifying steps, performing a weighted summing of the pressure and velocity traces in each pair, using a summation scalar as a weighting factor, to generate a plurality of summed traces; and storing the summed traces in the computer memory.

15. The system of claim 14, wherein each pressure trace corresponds to a hydrophone trace, and wherein each velocity trace corresponds to a geophone trace.

16. The system of claim 15, wherein the computer is programmed to perform the step of estimating a relative sensitivity by:

minimizing a difference between a first term comprised of a hydrophone ghost signal applied to the geophone trace, and a second term comprised of a geophone ghost signal applied to the hydrophone trace, wherein one of the first and second terms is multiplied by a scalar value; and selecting the scalar value corresponding to the minimized difference as the relative sensitivity.

17. The system of claim 15, wherein the computer is programmed to perform the step of estimating a relative phase angle by:

minimizing a folded cross-correlation of the geophone and hydrophone traces over a range of relative phase shifts between the geophone and hydrophone traces; and selecting the phase shift at which the folded cross-correlation is a minimum as the estimated relative phase angle.

18. The system of claim 15, wherein the computer is programmed to perform the weighted summing step by:

after the amplitude-modifying step, for each of the pairs, determining a hydrophone autocorrelation, a hydrophone-geophone cross-correlation, and a geophone-hydrophone cross-correlation;

after the determining step, stacking each of the hydrophone autocorrelations into a stacked hydrophone autocorrelation, stacking each of the hydrophone-geophone cross-correlations into a stacked hydrophone-geophone cross-correlation, and stacking each of the geophone-hydrophone cross-correlations into a stacked geophone-hydrophone cross-correlation;

estimating a geophone autocorrelation as the ratio of the product of the stacked hydrophone-geophone cross-correlation and the stacked geophonehydrophone cross-correlation to the stacked hydrophone autocorrelation;

minimizing an autocorrelation function based upon the stacked hydrophone-geophone cross-correlation, the stacked geophone-hydrophone cross-correlation, the stacked hydrophone autocorrelation, the estimated geophone autocorrelation, to estimate a seafloor reflection coefficient r as the reflection coefficient of the minimum of the autocorrelation function; and selecting the summation scalar to be $$\frac{1+r}{2}.$$

19. A computer-readable memory configured so that, when read and used by a computer, the computer is directed to filter the effects of ghost reflections from seismic survey signals corresponding to acoustic energy generated by a marine source and detected at a plurality of receiver locations, such detected energy including acoustic energy reflected from subsurface geological structures and ghost reflections from the water surface, wherein each of the receiver locations comprise a geophone for measuring velocity signals and a hydrophone for measuring pressure signals, said computer directed by a plurality of operations comprising:

retrieving, from computer memory, digital data corresponding to a plurality of pairs of pressure and velocity traces measured at one of the receiver locations, wherein the pressure and velocity traces in each pair each include a modulated signal corresponding to energy imparted from a common source location in the survey and reflected from a subsurface geological structure;

from the plurality of pairs of pressure and velocity traces, estimating a relative phase angle between the modulated signals of the pressure and velocity traces;

phase-modifying the pressure and velocity traces in each pair, relative to one another, with a phase shift corresponding to the estimated relative phase angle;

from the plurality of pairs of pressure and velocity traces, estimating a relative sensitivity between the modulated signals of the pressure and velocity traces;

amplitude-modifying the pressure and velocity traces in each pair, relative to one another, with an amplitude scalar corresponding to the estimated relative sensitivity;

after the phase-modifying and amplitude-modifying steps, performing a weighted summing of the pressure and velocity traces in each pair, using a summation scalar as a weighting factor, to generate a plurality of summed traces; and storing the summed traces in the computer memory.

20. The memory of claim 19, wherein each pressure trace corresponds to a hydrophone trace, and wherein each velocity trace corresponds to a geophone trace.

21. The memory of claim 19, wherein the computer is directed to perform the operation of estimating a relative sensitivity by:

minimizing a difference between a first term comprised of a hydrophone ghost signal applied to the geophone trace, and a second term comprised of a geophone ghost signal applied to the hydrophone trace, wherein one of the first and second terms is multiplied by a scalar value; and selecting the scalar value corresponding to the minimized difference as the relative sensitivity.

22. The memory of claim 19, wherein the computer is directed to perform the operation of estimating a relative phase angle by:

minimizing a folded cross-correlation of the geophone and hydrophone traces over a range of relative phase shifts between the geophone and hydrophone traces; and selecting the phase shift at which the folded cross-correlation is a minimum as the estimated relative phase angle.

23. The memory of claim 19, wherein the computer is directed to perform the weighted summing operation by:

after the amplitude-modifying step, for each of the pairs, determining a hydrophone autocorrelation, a hydrophone-geophone cross-correlation, and a geophone-hydrophone cross-correlation;

after the determining step, stacking each of the hydrophone autocorrelations into a stacked hydrophone autocorrelation, stacking each of the hydrophone-geophone cross-correlations into a stacked hydrophone-geophone cross-correlation, and stacking each of the geophone-hydrophone cross-correlations into a stacked geophone-hydrophone cross-correlation;

estimating a geophone autocorrelation as the ratio of the product of the stacked hydrophone-geophone cross-correlation and the stacked geophone-hydrophone cross-correlation to the stacked hydrophone autocorrelation;

minimizing an autocorrelation function based upon the stacked hydrophone-geophone cross-correlation, the stacked geophone-hydrophone cross-correlation, the stacked hydrophone autocorrelation, the estimated geophone autocorrelation, to estimate a seafloor reflection coefficient r as the reflection coefficient of the minimum of the autocorrelation function; and selecting the summation scalar to be $$\frac{1+r}{2}.$$

* * * * *